(12) United States Patent
Werner et al.

(10) Patent No.: US 11,541,685 B2
(45) Date of Patent: Jan. 3, 2023

(54) WHEEL COMPRISING A WHEEL RIM AND A WHEEL DISC

(71) Applicants: THYSSENKRUPP CARBON COMPONENTS GMBH, Wilsdruff STT Kesselsdorf (DE); thyssenkrupp AG, Essen (DE)

(72) Inventors: Jens Werner, Coswig (DE); Christian Koehler, Dresden (DE); Sandro Maeke, Dohma (DE); Michael Dressler, Dresden (DE); Andre Bartsch, Dresden (DE)

(73) Assignees: THYSSENKRUPP CARBON COMPONENTS GMBH, Wilsdruff STT Kesselsdorf (DE); thyssenkrupp AG, Essen (DE)

( * ) Notice: Subject to any disclaimer, the term of this patent is extended or adjusted under 35 U.S.C. 154(b) by 89 days.

(21) Appl. No.: 16/777,100

(22) Filed: Jan. 30, 2020

(65) Prior Publication Data

US 2020/0164680 A1 May 28, 2020

Related U.S. Application Data

(62) Division of application No. 15/103,964, filed as application No. PCT/DE2014/100444 on Dec. 12, 2014, now Pat. No. 10,583,688.

(30) Foreign Application Priority Data

Dec. 18, 2013 (DE) .................... 10 2013 114 342.3

(51) Int. Cl.
*B60B 3/04* (2006.01)
*B60B 5/02* (2006.01)
(Continued)

(52) U.S. Cl.
CPC ............... *B60B 3/041* (2013.01); *B60B 3/04* (2013.01); *B60B 3/044* (2013.01); *B60B 3/045* (2013.01);
(Continued)

(58) Field of Classification Search
CPC ................ B60B 5/02; B60B 2900/111; B60B 2900/212; B60B 2360/341;
(Continued)

(56) References Cited

U.S. PATENT DOCUMENTS 4,190,297 A * 2/1980 Schmidt .................. B60B 3/044
301/63.105
5,282,673 A 2/1994 Koyama
(Continued)

FOREIGN PATENT DOCUMENTS

AU 524458 B 9/1982
CA 2062981 A 11/1990
(Continued)

OTHER PUBLICATIONS

Reimpell, Fahrwektechnik: Reifen und Raeder. Wuerzburg. Volgel-Buchverlag, 1986, p. 109-110.

*Primary Examiner* — Kip T Kotter
(74) *Attorney, Agent, or Firm* — Heslin Rothenberg Farley & Mesiti, P.C.

(57) ABSTRACT

The invention relates to a wheel, especially for motor vehicles, comprising a wheel rim and a wheel disc, the wheel rim having a rim base made of fiber composite material. The invention is characterized in that the wheel disc (3, 11, 20, 29, 40) can be indirectly connected to the wheel rim (1), in particular the rim base (2), by means of a connecting element (5, 14, 22, 31, 35, 42) which is designed and
(Continued)

associated with the rim base (2) in such a way that the connected wheel disc (3, 11, 20, 29, 40) is not in contact with the rim base (2).

5 Claims, 5 Drawing Sheets

(51) Int. Cl.
*B60B 23/02* (2006.01)
*B60B 23/04* (2006.01)
*B60B 23/06* (2006.01)
*B60B 23/08* (2006.01)
*B60B 23/10* (2006.01)

(52) U.S. Cl.
CPC ............... *B60B 5/02* (2013.01); *B60B 23/02* (2013.01); *B60B 23/04* (2013.01); *B60B 23/06* (2013.01); *B60B 23/08* (2013.01); *B60B 23/10* (2013.01); *B60B 2310/305* (2013.01); *B60B 2310/306* (2013.01); *B60B 2310/318* (2013.01); *B60B 2360/341* (2013.01); *B60B 2360/3412* (2013.01); *B60B 2900/111* (2013.01); *B60B 2900/141* (2013.01); *B60B 2900/212* (2013.01); *B60B 2900/321* (2013.01); *B60B 2900/511* (2013.01); *B60Y 2200/10* (2013.01); *Y02T 10/86* (2013.01)

(58) Field of Classification Search
CPC . B60B 2360/3412; B60B 23/02; B60B 23/04; B60B 23/06; B60B 23/08; B60B 23/10; B60B 2310/318; B60B 3/04; B60B 3/041; B60B 3/042; B60B 3/044; B60B 3/045; B60B 3/047; Y02T 10/86
See application file for complete search history.

(56) References Cited

U.S. PATENT DOCUMENTS

| | | | |
|---|---|---|---|
| 9,340,066 | B2 | 5/2016 | Mueller |
| 9,573,414 | B2 | 2/2017 | Huidekoper |
| 2003/0038527 | A1 | 2/2003 | Tashiro |
| 2013/0330124 | A1 | 12/2013 | Haegele |
| 2014/0246895 | A1 | 9/2014 | Mueller |

FOREIGN PATENT DOCUMENTS

| | | | | |
|---|---|---|---|---|
| CN | 201777075 | U | 3/2011 | |
| DE | 3000767 | A1 * | 7/1981 | ............... B60B 5/02 |
| DE | 3915595 | A | 11/1990 | |
| DE | 41 23 459 | C | 11/1992 | |
| DE | 4223290 | A | 1/1993 | |
| DE | 102010053843 | A | 6/2012 | |
| DE | 102011075926 | A | 11/2012 | |
| DE | 102011083834 | A | 4/2013 | |
| DE | 102011120361 | A | 6/2013 | |
| EP | 0028393 | A | 5/1981 | |
| EP | 2607097 | A | 6/2013 | |
| FR | 2580550 | A | 10/1986 | |
| JP | 2002-002202 | A | 1/2002 | |
| WO | 0183240 | A | 11/2001 | |
| WO | 02098681 | A | 12/2002 | |
| WO | 2010093236 | A | 8/2010 | |
| WO | 2013083443 | A | 6/2013 | |

\* cited by examiner

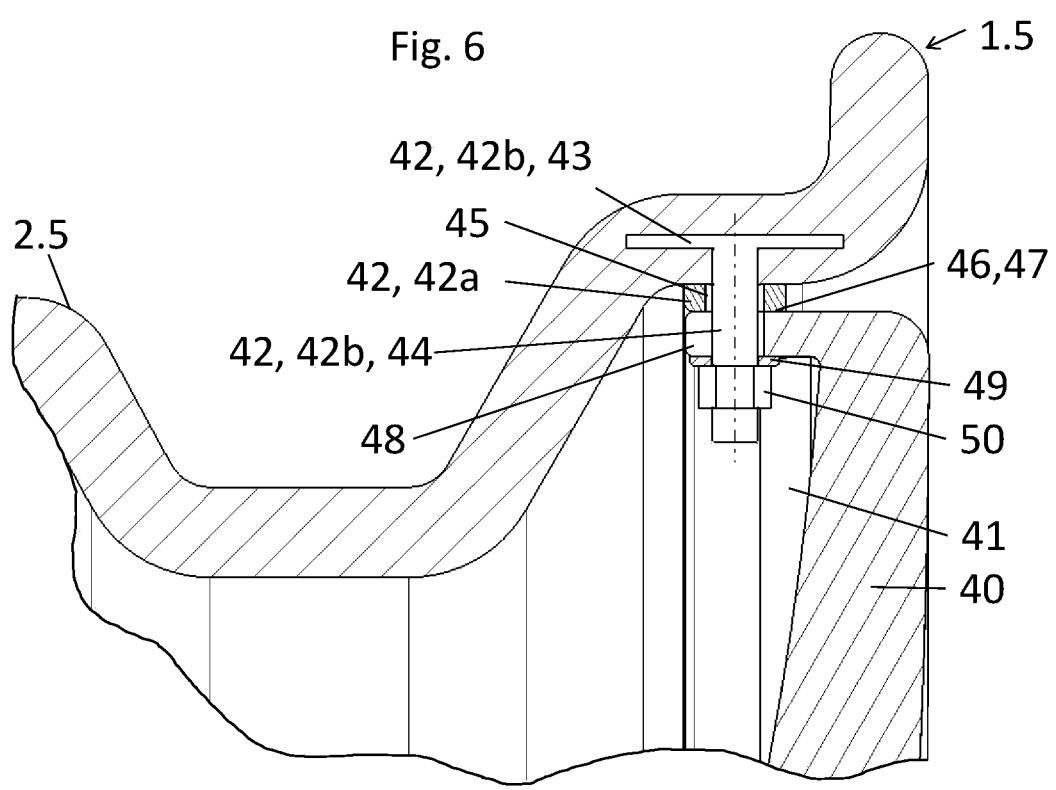

WHEEL COMPRISING A WHEEL RIM AND A WHEEL DISC

CROSS REFERENCE TO RELATED APPLICATIONS

This application is a U.S. Divisional Application of U.S. Non-provisional application Ser. No. 15/103,964, filed Jun. 13, 2016, which is a U.S. National Stage Entry of International Patent Application Serial Number PCT/DE2014/0100444, filed Dec. 12, 2014, which claims priority to German Patent Application No. DE 10 2013 114 342.3, filed Dec. 18, 2013, the entire contents of which are incorporated herein by reference.

The invention relates to a wheel, in particular for motor vehicles, with a wheel rim and a wheel disc, the wheel rim having a rim base made of fiber composite material.

FIELD

The present disclosure generally relates to a wheel for motor vehicles, with a wheel rim and a wheel disc.

BACKGROUND

Multi-part wheels are used as lightweight (construction) wheels in particular for motor vehicles. The lightweight wheels essentially consist of a wheel rim with a hollow profile with a rim base made of fiber composite material and a wheel disc made of fiber composite material or of any other material. The latter are also known as lightweight-hybrid wheels. The wheel discs of the multi-part wheels mostly have a plate-shaped or star-shaped design, whereby the plate-shaped wheel discs may have closed or open spoke areas.

With the multi-part wheels with a hybrid construction, the connections between the wheel rim and the wheel disc are problematic owing to the differing properties of the materials. In the case of connections between the wheel rim and the wheel disc which penetrate the rim base made of fiber composite material, leaks and a loss of pressure also appear in the wheel.

From document DE 10 2011 083 834 A9, a hybrid wheel is known in which a wheel spider made of metal or metal alloys is attached means of a clamping ring to the rim made of carbon fiber-reinforced plastic (CRP). The wheel spider, under the preload of the clamping ring, is supported on diagonal contours of the rim base. Under the thermal loads acting on the wheel spider when the wheel is in use, the clamping ring can slide on the contact surfaces in a radial direction. When the wheel is being used, this construction gives rise to an unfavourable relative movement between the wheel spider and the rim base, which leads to vibratory-rubbing wear on the fiber composite material of the rim base.

In addition, where the materials are in contact, particularly where the metallic wheel spider and the carbon fibers of the rim base are in contact, unwelcome corrosion appears.

Also, the geometry of the wheel spider must be based closely on the shaping of the contours of the rim base.

Thus a need exists for a wheel construction which eliminates the disadvantages of the prior art and, in particular, ensures improved attachment of the wheel disc to the wheel rim.

BRIEF DESCRIPTION OF THE FIGURES

FIG. 6 is a partial sectional view of a wheel in accordance with a sixth embodiment with an eleven-part connecting element.

DETAILED DESCRIPTION

Figure 1A:
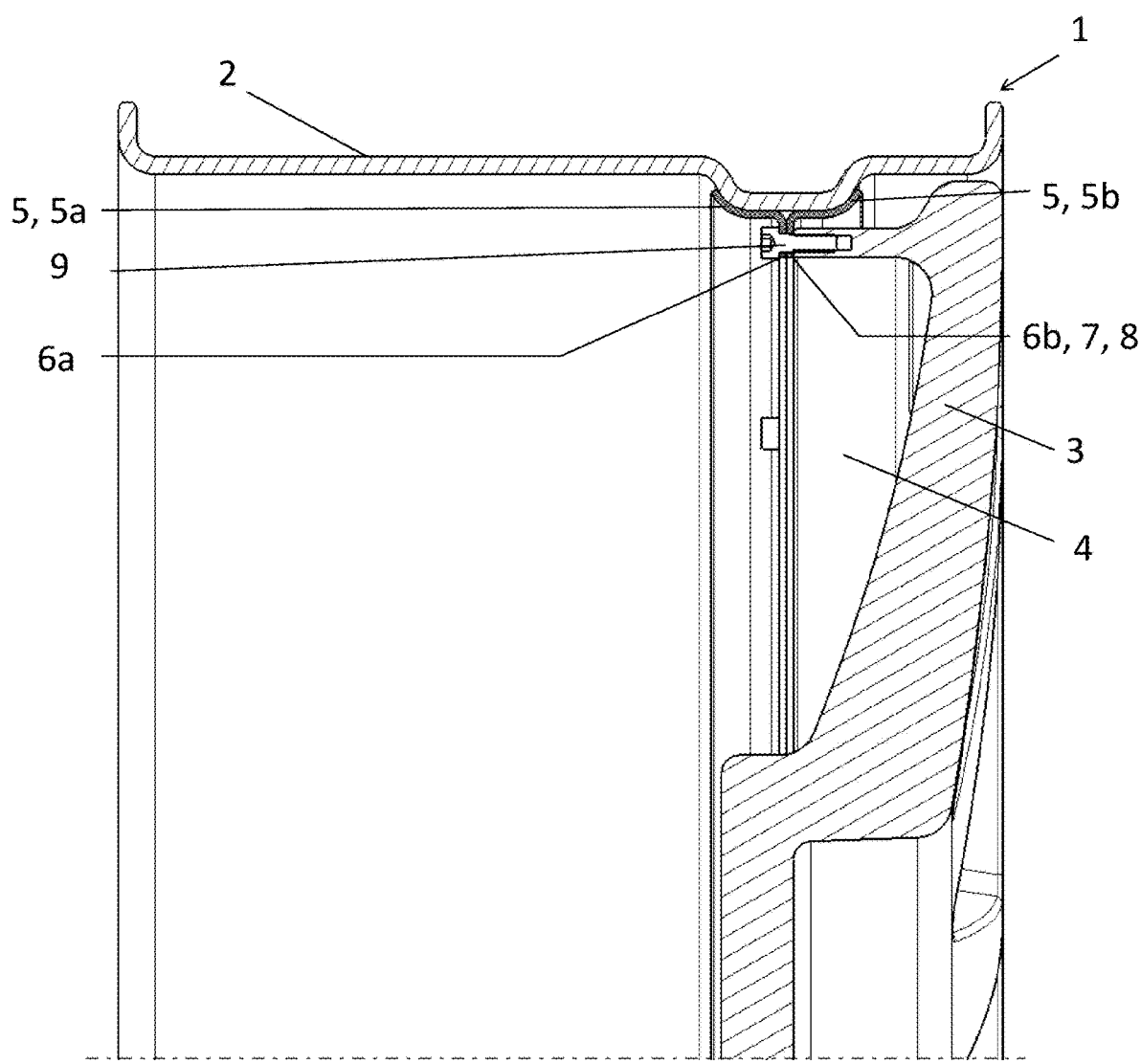
FIG. 1a is a partial sectional view of a wheel with a two-part, ring-shaped connecting element.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a wheel, in particular vehicles, with a wheel rim and a wheel disc, the having a rim base made of fiber composite material.

In accordance with the invention, the wheel disc can be connected by means of a connecting element to the wheel rim, in particular the rim base, whereby the connecting element is designed and associated with the rim base in such a way that the connected wheel disc is not in contact with the rim base.

In accordance with the invention, the connecting element attaches to the rim base of the wheel rim without penetrating it, and is designed with a connecting area separate from the rim base for connecting the wheel disc. This permits an indirect connection of the wheel disc with the wheel rim, without the connected wheel disc touching the rim base. The connecting element according to the invention is a separation and distancing aid for indirectly attaching the wheel disc to the rim base.

The attached wheel disc, in the assembled state, is only in contact with the connecting element and attached in an arrangement completely separated from and at a distance from the rim base. The flow of force is from the rim base exclusively via the connecting element into the wheel disc and vice versa.

The wheel disc, which owing to the thermal loads (e.g. from brake heat), expands during operation of the wheel, is—even in this state—only supported against the connecting element.

By this means, unfavourable frictional locking of the wheel disc with the rim base, and hence stress on the fibers of the fiber composite material is avoided. The connection between wheel disc and wheel rim becomes subject to less wear and more reliable under the operating conditions.

In addition, through the separated flow of force according to the invention, there is a more even distribution of tension and load in the structure of the fiber composite material of the rim base, which reduces the load on the rim base under the connection.

By indirectly connecting the wheel disc to the wheel rim, possible applications also present themselves in which the connecting element assumes a variety of useful separation roles for the wheel disc vis-à-vis the rim base.

Thus the wheel disc can, without giving particular consideration to the material-related peculiarities of the fiber composite material of the rim base, be attached to the connecting element using customary, tried-and-tested joining methods (e. g. soldering, welding, screwing).

In addition, the wheel disc to be connected to the wheel rim in the design according to the invention does not need any connecting contours that are coordinated with the rim base, which results in greater freedom of choice and design when it comes to the geometry of the wheel discs to be used.

In one advantageous embodiment, the connecting element has at least one connecting surface which is designed and arranged so as to correspond to one—or in each case one—connecting surface of the wheel disc.

According to this, the contact between the connecting element and the wheel disc for attachment of the wheel disc is not only completely separate from the rim base but also in the form of a homogeneous, two-dimensional bond which, when the wheel in operation, ensures a secure connection and provides even more uniform distribution of tension and load in the wheel geometry and in particular in the rim base.

Advantageously, the connecting element is associated with the rim base in the area of the well. By this means, a position of the connecting element in relation to the rest of the inner contour of the rim base is created where it projects internally in the rim cavity of the rim base, which makes it possible, by simple means, to connect the wheel disc with the connecting element at a distance from the inner contour of the rim base. The rim cavity is formed by the inner contour of the rim base that runs all the way round, whereby the well narrows the inner rim cavity.

In accordance with a preferred embodiment, it is envisaged that the connecting element is designed and associated so as to extend in the rim cavity of the wheel rim.

Thus a partial protrusion of the connecting element which overhangs the rim base on the inside is created, with the result that one or more connecting surfaces which are offset in relation to the inner contour of the rim base and point and/or extend into the rim cavity, can be provided for the connection of the wheel disc, which increases the diversity of attachment options and the reliability of the attachment the wheel disc.

As a result, in particular, of the connecting surfaces extending into the rim cavity and pointing in a diagonal or lateral direction, additional support of the wheel disc in an axial direction is enabled, which ensures a homogeneous distribution of the load being applied to the rim base.

In accordance with this design the wheel disc can, e.g. through a reliable clamp or screw connection, be tensioned in an axial direction against the lateral connecting surfaces of the connecting element.

In this way, the forces resulting from the operational thermal expansion of the wheel disc can for the most part, through frictional locking on the corresponding lateral connecting surfaces between the wheel disc and the load-bearing connecting element, be transmitted to the connecting element.

If, in accordance with a further advantageous embodiment, the connecting element is firmly connected to the rim base and designed as a fixed component of the wheel rim, a prefabricated unit of a wheel rim is provided for a separate, minimal-effort assembly of the wheel disc onto the wheel rim. Preferably, the wheel rim prefabricated with the connecting element is designed for universal wheel disc assembly.

In order to achieve this firm connection, the connecting element may for example during production of the rim base from fiber composite material be connected to its preform and subsequently consolidated with this.

Once the connecting element has been joined to the rim base, a wheel disc can subsequently be connected to the connecting element using the usual joining technologies.

In accordance with a favourable embodiment, the connecting element is designed and associated with the rim base in such a way that the connecting element is, at least section-wise, arranged so as to be integrated in the rim base. Hence the indirect connection of the wheel disc to the wheel rim maintains a firm positive fit between the connecting element and the rim base, and is less visually conspicuous.

The connecting element may, in addition to the constructive design in accordance with the invention, assume—thanks to the use of particular materials—additional separation roles which shield the rim base mechanically, chemically or thermally from the wheel disc.

In a further advantageous embodiment, the connecting element consists of a material which has a thermal coefficient of expansion which is at least similar (in relation) to the thermal coefficient of expansion of the fiber composite material of the rim base.

Such properties are held e.g. by special steel alloys. They are known for example by the names Invar® or Pernifer®. As a result, if the wheel is in use and being subjected to a thermal load (e.g. from brake heat), approximately equal thermal expansion properties of the connecting element and the rim base are generated.

As a result of the approximately equal thermal expansion properties of connecting element and rim base, a compensatory deformation of both components is achieved, as a result of which tensions in the rim base that can lead to cracks in the fiber composite material of the rim base are avoided.

With this advantageous embodiment, if the wheel is subjected to a load, a tension is only generated between the wheel disc and connecting element, whereby the load-bearing connecting element performs thermal expansion compensation.

By this means, the distribution of tension can be improved further and the load on the connected wheel construction be additionally reduced.

It is particularly advantageous if, in an area of contact between the rim base and the connecting element, i.e. between a contact surface of the rim base facing, the connecting element and a contact surface of the connecting element facing the rim base, a separation layer is arranged which creates an indirect connection between rim base and connecting element, which, in combination with the connecting element, can perform additional separation functions between wheel rim and wheel disc. Through the use of the separation layer there also results a gain in terms of freedom of choice of the material to be used for the connecting element and the wheel disc.

Preferably, the separation layer is constructed on the connecting element, e.g. by coating the connecting element appropriately. This reduces the constructional effort in the indirect connection of rim base and connecting element, and increases the positional stability of the separation layer between the rim base and the connecting element.

It is associated with the same advantages if, in addition to or by way of an alternative to the separation layer described above, a separation layer is arranged in a connecting area between the connecting element and the wheel disc. Preferably, the separation layer is constructed by coating the connecting element appropriately.

With a particularly advantageous embodiment, the connecting element and/or the separation layer have an elasticity which is greater than the elasticity of the fiber composite material of the rim base.

As a result of their elastic properties, the connecting element or the separation layer brings about—in the event of the wheel disc being subjected to a load—expansion compensation through deformation and adaptation of the layer thickness.

In particular with a wheel with a hybrid construction, with for example a wheel disc made of aluminium, the wheel disc expands—under heat generation when the wheel is in use—significantly more than the rim base. Through this design with an elastic separation layer, improved distribution of tension and load in the wheel rim, with less transfer of tension onto the rim base, is brought about, as a result of which the stresses of the attachment to the rim base can be reduced.

This design can for example be used if, due to certain functional requirements, a connecting element with thermal expansion properties that deviate from the rim base, e.g. connecting element made of metal, is to be used.

Preferably, the separation layer consists of a rubbery-elastic plastic, e.g. of the elastomer formed as an adhesive layer between the rim base and the connecting element. The material stands out, as well as for its good elastic properties, for a favourable weight/rigidity ratio and for its good adhesive properties.

In accordance with a particularly preferred embodiment, the connecting element and/or the separation layer consist of an electrically insulating material.

In particular with the use of wheel discs made from metal, the electrically insulating connecting element or the electrically insulating separation layer brings about galvanic isolation between the wheel disc and the rim base made of fiber composite material, which avoids galvanic voltages between the plastic, in particular carbon fiber-reinforced plastic, of the rim base and the metallic wheel disc.

The appearance of corrosion in the wheel disc is thus prevented long term.

The insulating separation layer may consist e.g. of ceramic, of a polymer, or of a glass fiber-reinforced plastic (GRP).

GRP is particularly suitable as a material for the insulating connecting element.

In accordance a further advantageous development, it is envisaged that the separation layer consists of a material which has a larger thermal conductivity resistance compared with the thermal conductivity resistance of the material of the connecting element. A separation layer made of a material with such a high thermal conductivity resistance as e.g. GRP or ceramic generates a thermal resistance which inhibits the transmission of production-related or operational heat loads to the rim base and protects the material the rim base from excessively high temperatures, which has a positive effect on the capacity of the rim base to withstand stresses.

In particular, by means of such a separation layer, thermal loads resulting from thermal joining techniques, such as welding for attachment of the wheel disc, or from brake heat during operation of the wheel, can be well compensated.

If the connecting element consists of a material which has a larger thermal conductivity resistance compared with the thermal conductivity resistance of the material of the wheel disc, the same advantageous effects can be achieved; in particular, the rim base can be favourably protected from the thermal load resulting from the brake heat during operation of the wheel.

Preferably, the connecting element and/or the separation layer consist of class fiber-reinforced plastic (GRP). In addition to the outstanding galvanic and thermal separation functions assumed by a connecting element or a separation layer made of GRP, this material has good adhesive properties and high strength with low weight.

A connecting element made of GRP or a separation layer made GRP is particularly suitable for a firm, material connection with the rim base and for securely attaching a wheel disc where there are requirements for lightweight construction.

The material therefore creates a very good material bond with the fiber composite material of the rim base and ensures, where there requirements for lightweight construction, a secure, indirect attachment of the wheel disc to the wheel rim.

The favourable strength/weight ratio of GRP makes it possible to achieve, unproblematically, insulating separation layers of made of GRP with larger layer thicknesses.

As a result of the low rigidity of the GRP, a connecting element made of GRP has a low deformation resistance, which, with the operational thermal load on the wheel construction (e.g. from brake heat) has a tension-reducing effect on the rim base.

In a preferred embodiment, the connecting element and/or the wheel disc have one or more sealing elements which seal the connecting element off from the rim base and/or from the wheel disc. Thereby the penetration of moisture into the joint areas between the rim base and the connecting element and/or between the wheel disc and the connecting element can be prevented. In particular in the case of critical material combinations, e.g. a connecting element made of stainless steel and a wheel disc made of aluminium, contact corrosion can thus be largely avoided.

In a particularly preferred embodiment, the connecting element has a ring-shaped structure, as a result of which a large-area, homogeneous introduction of force—distributed across the circumference—from the wheel disc into the rim base and vice versa, is brought about. The homogenisation of the distribution of force is particularly efficient if spokes from a star-shaped wheel disc are connected to the ring-shaped connecting element, in which case the introduction of force at isolated points from the spokes of the wheel disc is converted into an all-over distribution of force in the rim base.

In addition, the connecting element available in a ring shape permits considerable design freedom when it comes to selecting the geometry of the wheel disc to be connected.

If the connecting element has a multi-part design, this may make attaching the connecting element to the wheel rim or the rim base easier. By this means it is possible, for example, for certain contours or the rim base—such as the well—to be enclosed on both sides. In addition, this enables further material variability in that the parts of the connecting element can, according to requirements, consist of different materials.

An embodiment that is favourable in terms of construction a design envisages that the wheel disc can be connected by means of several connecting elements, preferably arranged around the circumference of the wheel rim, to the wheel rim, or to the rim base. In particular when star-shaped wheel discs with spokes are used, individual connecting elements can only be provided in the area of the connecting ends of the spokes. This can lead to design-related advantages and helps save weight.

This and further features apparent from the patent claims, the description of the embodiments and the drawings can, in each case for themselves or in combination, be put into practice as advantageous embodiments of the invention for which protection is being claimed here.

FIG. 1a shows, in a first embodiment, a wheel construction according to the invention with a wheel rim 1, which has a rim base 2 made of carbon fiber-reinforced plastic (CRP), and with a plate-shaped wheel disc 3 with an open spoke area and a spoke ring 4 made of aluminium. The wheel disc 3 is connected by means of a two-part connecting element 5 made of stainless steel with the rim base 2 of wheel rim 1. The connecting element 5 consists of two ring-shaped shell components 5a, 5b which enclose, on both sides, a well of the rim base 2 and have flange rings 6a, 6b which extend inwards in a radial direction. The spoke ring 4 of the wheel disc 3 contacts, with its front face 7, the front side of a corresponding connecting surface 8, pointing in an axial direction, of flange ring 6b of the shell component 5b, and is attached by means of several fastening screws 9 to the connecting element 5. Through the shape of the shell components 5a, 5b which is adapted to the well, together with the screw connection a clamping effect of the connecting element 5 onto the rim base 2 is brought about. The detachable connection between the connecting element 5 and the rim base 2 and that between the wheel disc 3 and the connecting element 5 can in each case be supplemented by a material connection, for example by gluing the components together, which increases the strength of the connections.

The wheel disc 3 has, as a result of the indirect connection with the rim base 2 by means of the connecting element 5, no direct contact with the rim base 2. The front face 7 of the spoke ring 4, as a connecting surface 7 of the wheel disc 1, contacts solely the connecting surface 8 of the flange ring 6b.

The radially extending flange rings 6a, 6b of the shell components 5a, 5b of the connecting element 5 are extended inwards in a radial direction into the rim cavity in such a way that the connecting surface 8 formed thereon and pointing in a radial direction can contact with the front face 7 of the spoke ring 4. The attached wheel disc 3 is then arranged at such a distance from the rim base 2 that even during operation when subjected to a mechanical load (dynamic vibrations, forces, moments) and a thermal load (thermal expansion) no contact or frictional locking occurs between the rim base 2 and the wheel disc 3. The flow of the forces and moments to be transmitted is from the wheel disc 3 solely via the connecting element 5 into the rim base 2 and thus generates a more even, stress-reducing distribution of tension and load in the structure of the CRP of the rim base 2.

The distanced, non-contact arrangement of the wheel disc 3 in relation to the rim base 2 makes it possible for the wheel disc 3 to, for the most part, freely deform under the thermal and mechanical loads during operation of the wheel, without damaging the rim base 2 or causing wear to the carbon fibers of the fiber composite material of the rim base 2.

Through the indirect connection of the wheel disc 3 to the connecting element 5, relative movements between the wheel disc 3 and the rim base 2, which could lead to vibratory-rubbing wear, are for the most part avoided.

The outer contour running all the way around wheel disc 3 is, as a result of the non-contact arrangement in relation to the rim base 2, designed largely independent of the inner contour running all the way around the rim base 2.

The two shell components 5a, 5b of the connecting element 5 consist of a particular steel alloy, such as Invar® or Pernifer®, which has approximately the same coefficient of thermal expansion as that of the GRP of the rim base 2.

As a result of this, the brake heat which, when the wheel is used is transmitted from the wheel disc 3 to the connecting element 5 and the rim base 2, generates approximately equal thermal expansion properties of the connecting element 5 and the rim base 2. The deformation of the connecting element 5 and of the rim base 2 which are adapted to fit each other thus avoids tensions in the rim base 2 made of CRP as a result of the heat generation when the wheel is in operation.

Figure 1B:
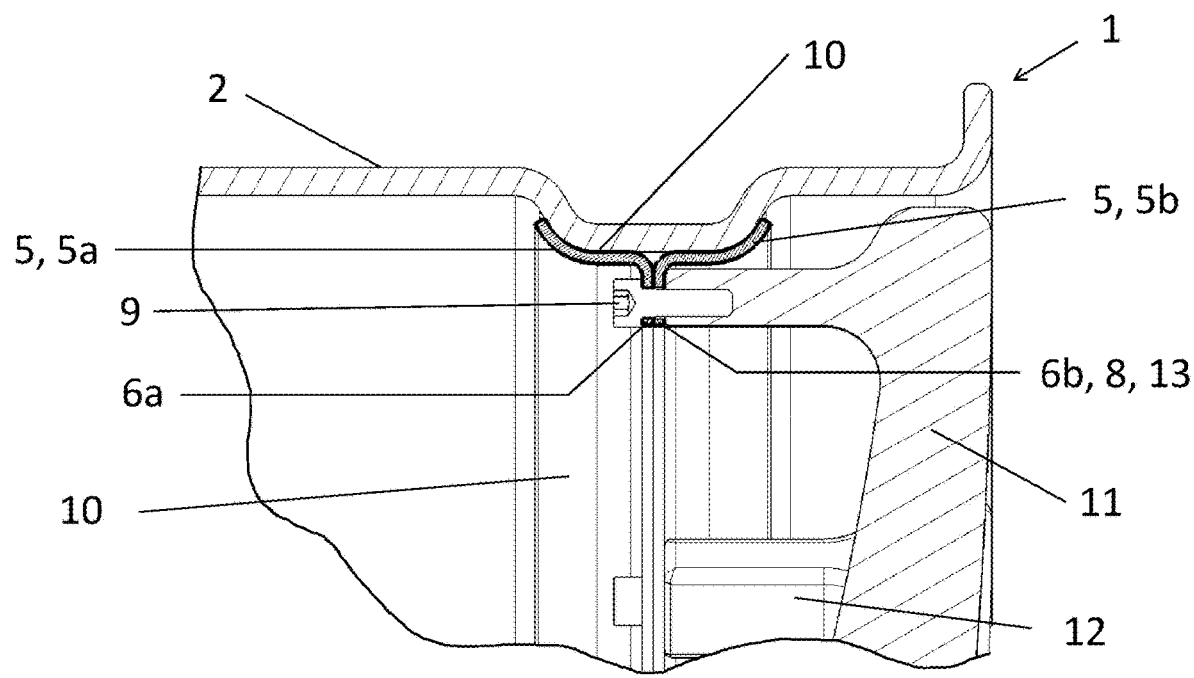
FIG. 1b is a partial sectional view of the wheel in accordance with FIG. 1a with a separation layer on the two-part ring-shaped connecting element.

FIG. 1b depicts a wheel construction similar to FIG. 1a in which, unlike FIG. 1a, the shell components 5a, 5b of the connecting element 5 consist of steel and in each case are coated all over their surface with an elastic separation layer 10 made of an elastomer such as KRAIBON®.

In FIG. 1b, in a further difference from wheel disc 3 in accordance with FIG. 1a, a star-shaped wheel disc 11 with individual spoke ends 12 made of aluminium is connected by means of the connecting element 5 to the rim base 2 of the wheel rim 1, whereby the front faces 13 of the spoke ends 12 of the wheel disc 11 have all-over contact with the connecting surface 8, pointing in an axial direction, of the flange ring 6b of the shell component 5b and the spokes 12 of the wheel disc 11 are attached by means of the fastening screws 9 to the connecting element 5.

The ring-shaped connecting element 5 in accordance with this embodiment likewise makes it possible to arrange and attach the wheel disc 11 with the previously described advantages at a non-contacting distance from the rim base 2.

The coating of the connecting element 5 with the elastic separation layer 10 also creates additional advantages.

The coating of the shell components 5a, 5b of the connecting element 5, in particular the coating on the contact surfaces of the shell components 5a, 5b facing the rim base 2 and on the flange rings 6a, 6b, firstly assist with compensation of the operational expansion of the connected wheel disc 11. Secondly, this coating achieves galvanic isolation between the connecting element 5 made of steel and the rim base 2 made of CRP in order to reduce the appearance of corrosion on the connecting element 5 resulting from the carbon fibers of the CRP. The coating of the flange rings 6a, 6b in the area of connection of the wheel disc 11 additionally achieves galvanic isolation between wheel disc 11 made of aluminium and the connecting element 5 made of steel in order to reduce the appearance of corrosion on the wheel disc 11.

Figure 2:
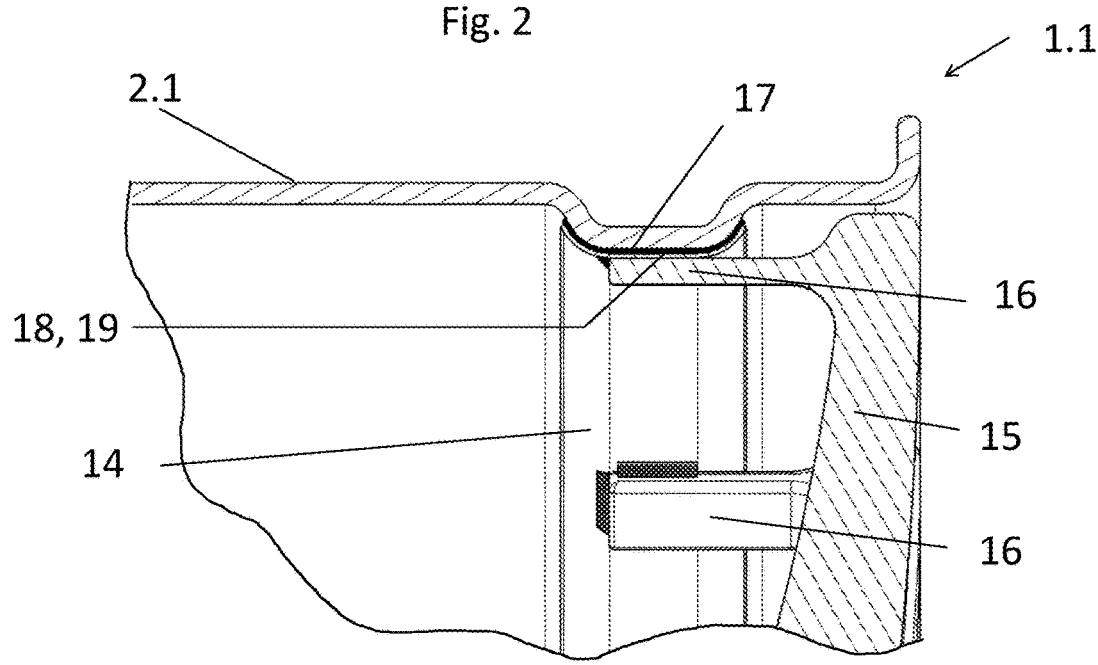
FIG. 2 is a partial sectional view of a wheel in accordance with a second embodiment, with a ring-shaped connecting element that is firmly connected to the rim base.

FIG. 2 depicts, in a partial sectional view, a wheel in accordance with a second embodiment. The wheel has a wheel rim 1.1 with a rim base 2.1 made of CRP and with a ring-shaped connecting element 14 made of stainless steel (Pernifer®), connected to the rim base 2.1, to which a star-shaped wheel disc 15 with individual spoke ends 16 made of aluminium is connected.

In the following, only the differences vis-á-vis the previously described embodiment in accordance with FIGS. 1a and 1b shall be outlined.

The ring-shaped connecting element 14, which is formed as one part all the way round, fully encloses the well of the rim base 2.1. This particular positive fit between the connecting element 14 and the rim base 2.1 can be produced for example through a process-integrated joining of the components during the manufacture of the preform of the rim base 2.1 made of CRP. During the subsequent consolidation of the fiber material, the connecting element 14 is simultaneously firmly bonded—through gluing—with the rim base 2.1 and thereby firmly connected and unable to be detached.

Between the rim base 2.1 and the connecting element 14, a separation layer 17 made of ceramic is provided, which is designed as a coating of the surface of the connecting element 14 facing the rim base 2.1.

On the ring-shaped connecting element of the wheel rim 1.1, a contact surface 18, which points inwards in a radial direction into the rim cavity and goes all the way round, is constructed for the connection of the wheel disc 15. This connecting surface 18 is, thanks to its particular position and alignment in the area of the well, offset inwards in relation to the remaining inner contour of the rim base 2.1 and permits, in relation to the rim base 2.1, a non-contact, spaced connection of the wheel disc 15 to the wheel rim 1.1.

The—in each case—outer edges 19 of the spokes 16 are in contact with the connecting surface 18, which points inwards in a radial direction and goes all way round, of the connecting element 14, whereby each spoke end 16 is attached to the connecting element 14 by means of weld joints formed on three sides.

With the wheel construction in accordance with the second embodiment, the advantage, already outlined for the preceding embodiment also occur.

The planar connecting surface 18 pointing inwards in a radial direction also permits a universal connection of different types of wheel discs with different joining techniques, e. g. soldering, welding or gluing.

The envisaged separation layer 17 made of ceramic has, alongside its insulating property and the associated galvanic protective function, significantly higher thermal conductivity resistance the connecting element 14 made of stainless steel. A heat influx exerted on the connecting element 14, for example through the envisaged welding-on of the spoke ends 16, therefore barely has any impact on the rim base 2.1. In particular, the rim base 2.1 is protected from thermal loads and thus damage to the matrix material avoided long term and tensions in the rim base 2.1 reduced. The rim base 2.1 is, through the separation layer 17, also protected from the thermal load resulting from the brake heat generated when the wheel is in operation.

Figure 3:
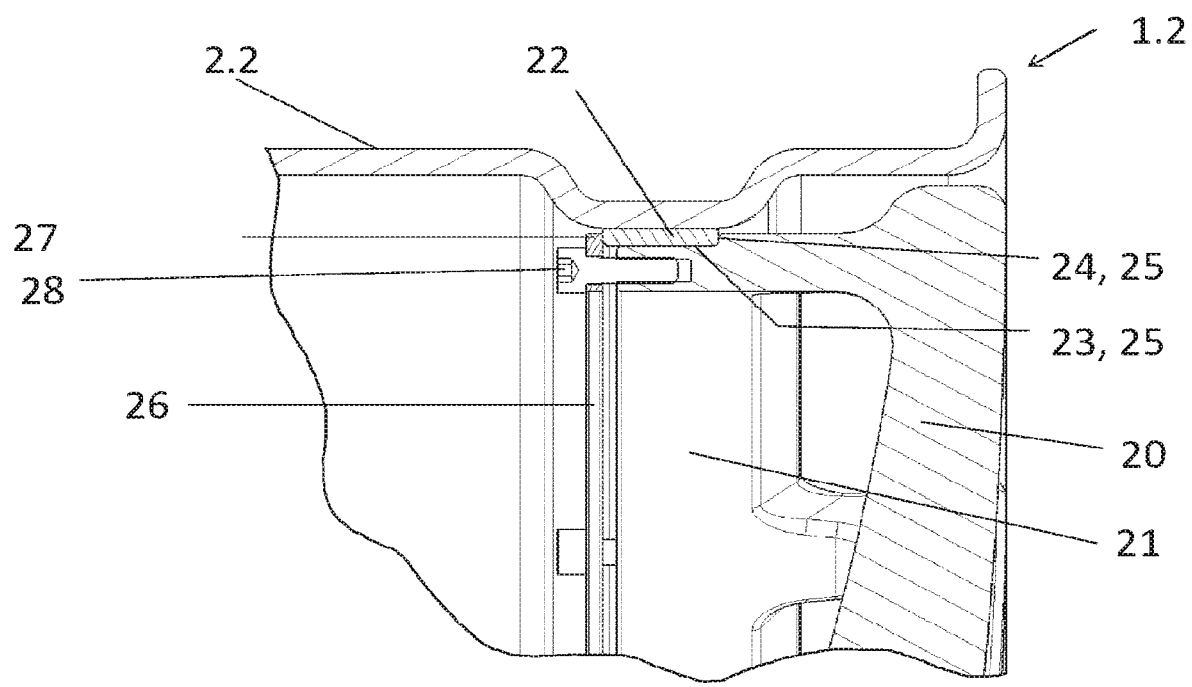
FIG. 3 is a partial sectional view of a wheel in accordance with a third embodiment with a ring-shaped connecting element made of GRP firmly connected to the rim base.

FIG. 3 shows, in a third embodiment, sections of an alternative wheel construction according to the invention with a wheel rim 1.2 and a plate-shaped wheel disc 20 with open spoke area and spoke ring 21 made of aluminium. The wheel rim 1.2 has a ring-shaped connecting element 22 which is firmly connected to the rim base 2.2 made of CRP. The connecting element 22 consists of glass fiber-reinforced plastic (GRP) and is, in this embodiment, by way of an example, connected undetachably to the rim base 2.2. by means of gluing. The material (GRP) of the connecting element 22 is particularly suitable for a stable glued connection with the CRP of the rim base 2.2.

The gluing zone is formed between a contact surface of the well of the rim base 2.2 that points inwards in a radial direction and goes all the way around and a contact surface of the ring-shaped connecting element 22 which faces the rim base 2.2 and has all-over contact with it.

The adhesive connection can take place on the finished, hardened rim base 2.2. Alternatively, the adhesive connection can be directly produced during the manufacture of the rim base 2.2 from CRP by attaching the ring-shaped connecting element 22 to a prefabricated preform of the rim base 2.2 and subsequent infiltration and hardening of the matrix material.

The connecting element 22 made of GRP is particularly light and yet still has high rigidity for a reliable attachment of the wheel disc 20.

The ring-shaped connecting element 22 has an essentially rectangular ring cross section which, projecting beyond the inner contour of the rim base 2.2, extends inwards in a radial direction. A connecting surface 23, which points inwards in a radial direction and goes all the way round, of connecting element 22, and a connecting surface 25 that points in an axial direction and goes all the way round, are correspondingly in contact with a recess 25, which corresponds to these connecting surfaces 23, 25 and goes all the way round, of the spoke ring 21 of the wheel disc 20. Through a clamped connection, the wheel disk 20 made of aluminium is attached to the connecting element 22. To achieve the clamped connection, a clamping ring 26 of aluminium is arranged on the opposing stop face 27, which points in an axial direction, of the connecting element 22 and, with several fastening screws 28 that are distributed over the circumference of the wheel rim 1.2, is tensioned with the spoke ring 21 against the connecting element 22.

The ring-shaped connecting element 22 in accordance with this embodiment likewise makes it possible to arrange and attach the wheel disc 20 at a non-contact distance from the rim base 2.2, whereby here too, the advantages already outlined for the preceding embodiments occur.

Furthermore, if the GRP of the connecting element 22 has a thermal resistance that is larger in relation to the thermal resistance of the aluminium of the wheel disc 20, then during operation of the wheel the transfer of the brake heat generated onto the rim base 2.2 is significantly reduced.

In addition, through the GRP of the connecting element 22, a galvanic isolation of the wheel disc 20 and of the clamping ring 26 in relation to the rim base 2.2 made of CRP is achieved, which avoids corrosion on the wheel disc 20 and the clamping ring 26 made of aluminium as a result of the carbon fibers of the CRP.

The ring-shaped design—going all the way round—of the connecting element 22 and the large-area attachment of the wheel disc 20 to the connecting element 22 additionally ensure improved load distribution on the rim base 2.2.

The connecting element 22 which is firmly connected to the rim base 2.2 forms a universal, prefabricated unit of the wheel rim 1.2 which is available for the individual assembly of different wheel discs.

Figure 4:
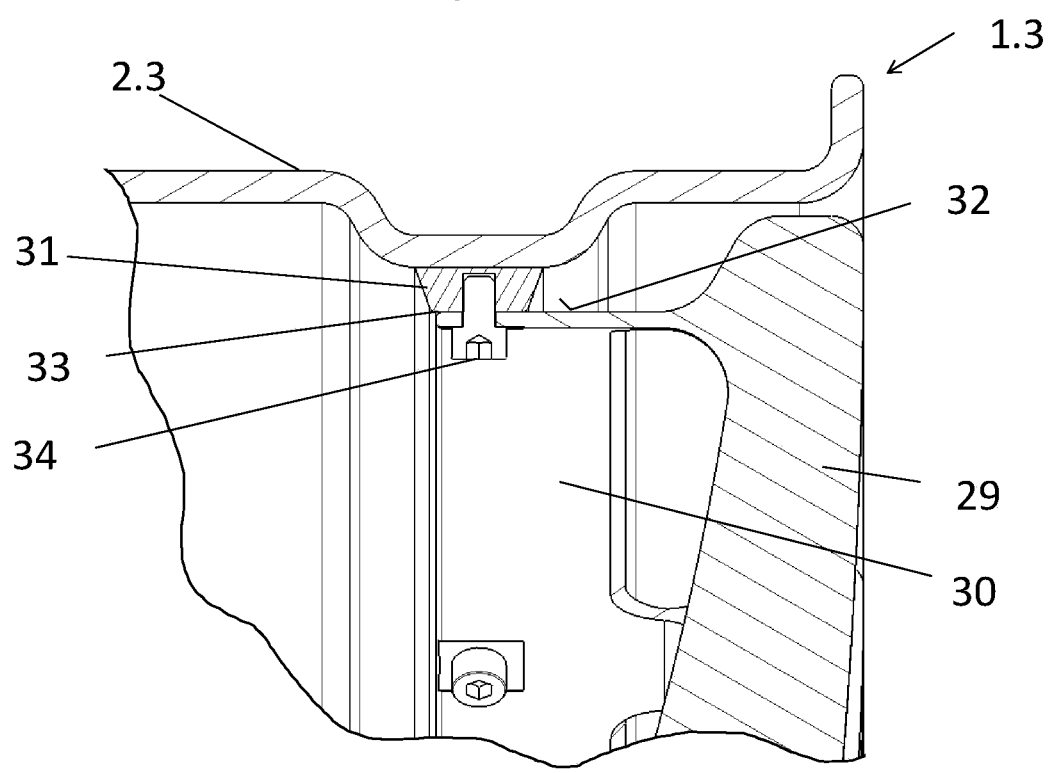
FIG. 4 is a partial sectional view of a wheel in accordance with a fourth embodiment with a further ring-shaped connecting element made of GRP.

FIG. 4 shows, in a fourth embodiment, a further wheel construction with a wheel rim 1.3 and a plate-shaped wheel disc 29 with open spoke area and spoke ring 30 made of aluminium. The wheel rim 1.3 has, similar to the embodiment in accordance with FIG. 3, a ring-shaped connecting element 31 firmly connected to the rim base 2.3 made of CRP. The connecting element 31 is, like the connecting element 22 in accordance with FIG. 3, designed and arranged so as to extend inwards in a radial direction in relation to the rim base 2.3 and, corresponding to the description of the embodiment in accordance with FIG. 3, undetachably connected to the rim base 2.3 by means of gluing.

An outer shell 32 of the spoke ring 30 of the wheel disc 29 contacts—corresponding across the whole circumference—with a connecting surface 33, which points inwards in a radial direction and goes all the way round, of the ring-shaped connecting element 31. With individual fastening screws 34 distributed across the circumference of the wheel rim 1.3, the wheel disc 29 is connected to the connecting element 31.

The ring-shaped connecting element 22 in accordance with this embodiment likewise makes it possible to arrange and attach the wheel disc 20 at a non-contact distance from the rim base 2.2, whereby here, too, the advantages already outlined for the preceding embodiments occur.

This design brings about, alongside the advantages already outlined for the preceding embodiments, the further advantage that the connection of the wheel disc 29 to the wheel rim 1.3 can be over a particularly large area and with radially directed tension against the ring-shaped connecting element 31. Through this planar radial attachment of the wheel disc to the ring-shaped connecting element, relative movements between the wheel disc and the connecting element which could lead to vibratory-rubbing wear are for the most part avoided.

Alternatively, instead of the ring-shaped connecting element 31 which is closed all the way round, several individual connecting elements distributed across the circumference of the wheel rim 1.3 may be provided, by means of which the wheel disc 29 with spoke area and spoke ring 30 or a wheel disc with spoke ends is indirectly connected to the rim base 2.3 (not shown). The connecting elements are preferably arranged to correspond to the number and arrangement of the spokes on the circumference of the rim base 2.3 and have, in each case, a connecting surface that is essentially disk-shaped and directed inwards in a radial direction into the rim cavity (not shown).

This design leads, in addition to the advantages already outlined for the preceding embodiments, to weight savings and to the individual connecting elements being set further back, which is advantageous from a visual point of view.

Figure 5:
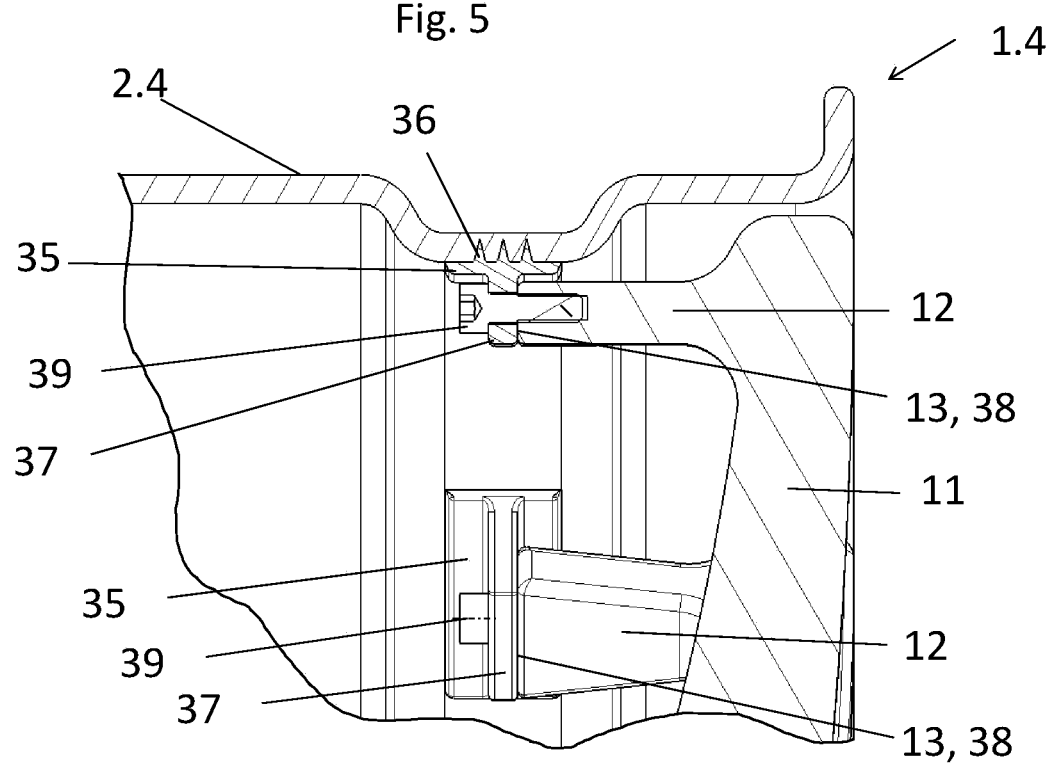
FIG. 5 is a partial sectional view of a wheel in accordance with a fifth embodiment with several ring segment-shaped connecting elements.

A fifth embodiment of a wheel in accordance with FIG. 5 depicts a wheel rim 1.4 with a rim base 2.4 made of glass fiber-reinforced thermoplastic (Polyamide 6) and several ring segment-shaped connecting elements 35 made of steel integrated along the circumference of the wheel rim 1.4 into the rim base 2.4, which assists the indirect connection of a wheel disc, such as the star-shaped wheel disc 11 with spoke ends 12 of aluminium, as per the embodiment in accordance with FIG. 1b.

For a suitable connection of the star-shaped wheel disc 11, the connecting elements 35 are provided in the number and arrangement corresponding to that of the spokes 12 of the star-shaped wheel disc 11 to be attached.

The ring segment-shaped connecting elements 35 have pin elements 36, facing the rim base 2.4 and extending into the rim base 2.4, which are integrated into the rim base 2.4. The integrated connection of the connecting elements 35 with the rim base 2.4 can be achieved by means of a hot pressing technique, in which the connecting elements 35 are pressed into the rim base 2.4 (made of Polyamide 6). The pin elements 36 which are directly pressed in during this process each form a tangential and axial positive fit between the connecting element 35 and the rim base 2.4.

The connecting elements 35 in each case nave flange bars 37, which extend inwards in a radial direction into the rim cavity, to which the spoke ends 12 of the star-shaped wheel disc 11 are connected. The spoke ends 12 in each case contact, with their front faces 13, a lateral connecting surface 38, pointing in an axial direction, of the flange bars 37, and are connected by means of the fastening screws 39 to the connecting elements 35 and hence to the wheel rim 1.4. Through the connection of the spoke ends 12 of the star-shaped wheel disc 11 to the individual connecting elements 35, these are additionally fixed in an axial direction, as a result of which ultimately a fixed, three-dimensionally positive-locking connection is produced between the connecting elements 35 and the rim base 2.4.

In addition to the advantages of the previously described embodiments, this design enables very reliable, weight-minimised and from a visual perspective particularly inconspicuous connections to be achieved for the attachment of preferably star-shaped wheel discs, such as wheel disc 11, to the wheel rim 1.4.

FIG. 6 shows, in a sixth embodiment, a further wheel construction with a wheel rim 1.5 and a plate-shaped wheel disc 40 with an open spoke area and spoke ring 41 made of aluminium. The wheel rim 1.5 has an eleven-part connecting element 42 firmly connected to the rim base 2.5 made of CRP which consists of one ring component 42a and ten pin components 42b.

The ring component 42a, which is designed so that it is rotationally symmetrical to the notional wheel axis all the way round, consists of GRP.

The delicately designed pin components 42b are arranged distributed around the circumference the wheel rim 1.5 and consist of Pernifer®. In each case, they have a plate-shaped head 43 and a shaft 44 with a screw thread formed on the shaft end.

The multi-part connecting element 42 is, in area of the tyre seating, connected to the rim base 2.5, whereby the ring component 42a is attached on the inner contour of the tyre seating and the pin components 42b are partially arranged so as to be integrated in the rim base 2.5. The pin components 42b are associated with the rim base 2.5 in such a way that their plate-shaped heads 43 sit in a tangential alignment in the rim base 2.5 and the shafts 44 of the pin elements 42b are directed inwards in a radial direction onto the notional wheel axis.

All parts 42a,b are designed so as to be, in relation to the rim base 2.5, extended inwards in a radial direction into the rim cavity, whereby the particular shafts 44 of the pin elements 42b protrude through corresponding openings 45 of the ring component 42a and project beyond the internal diameter of the ring component 42a.

The ring component 42a and the pin components 42b are directly associated with the fiber material or integrated into the fiber material during production of the preform of the rim base 2.5 and, during the manufacturing process, joined together with the rim base 2.5—positively and so as to be firmly bonded—in the previously described arrangement.

An outer shell 46 of the spoke ring 41 of the wheel disc 40 contacts—corresponding across the whole circumference—with a connecting surface 47, which points inwards in a radial direction and goes all the way round, of the ring component 42a.

The spoke ring 41 has ten slots 48 which correspond to the number and arrangement of the shafts 44 of the pin elements 42b, whereby, during the assembly of the wheel disc 40 every slot 48 serves to accommodate one shaft 44. The size of the slot 48 brings about a spaced positioning of the pin component 42b vis-á-vis the spoke ring 41 of the wheel disc 40.

Each shaft 44 is fitted with a washer 49 made for example from GRP and equipped with a nut 50, and the screw connection between the wheel disc 40, the ring component 42a and the pin components 42b tightened. The wheel disc 40 is therefore only indirectly connected to the rim base 2.5 of the wheel rim 1.5.

With this design there is, in turn, a particularly large-area connection of the wheel disc 40 to the wheel rim 1.5 with even, radially directed pressure distribution of the tension between wheel disc 40 and wheel rim 1.5 as per the design in accordance with FIG. 4. Through the planar radial connection of the wheel disc 40 to the ring component 42a, relative movements between the wheel disc 40 and the parts 42a, 42a of the connecting element 42, which could lead to vibratory-rubbing wear, are mostly avoided.

Unlike the design in accordance with FIG. 4, the local introduction of force from the screw connections goes directly into the pin components 42b that are integrated in the rim base 2.5, as a result of which the ring component 42a is placed under less stress from the force fit of the screw connection. The ring component 42a made of GRP can therefore, compared with the connecting element 31 in accordance with FIG. 4, be designed to be even thinner-walled and lighter.

The multi-part connecting element 42 is designed in a targeted and efficient way in respect of the transmission of the forces acting during connection of the wheel disc 40 and during operation of the wheel, as a result of which a further weight-saving is achieved when it comes to the wheel construction.

The connected wheel disc 40 does not touch the rim base 2.5 with the pin components 42b, which avoids any contact corrosion on the wheel disc 40.

The heat generated in the wheel disc 40 during operation of the wheel is, thanks to the particular design of the connection of the wheel disc 40 to the multi-part connecting element 42, only transferred to a small extent to the connecting element 42 and the rim base 2.5.

In addition, the ring component 42b of the connecting element 42 has a greater thermal resistance compared with the thermal resistance of the wheel disc 40 made from aluminium, so that the rim base 2.5 is additionally shielded from the thermal load from the brake heat.

The pin components 42b made of Pernifer® have approximately the same thermal coefficient of expansion as that of the GRP of the rim base 2.5, so that, in addition, thanks to the approximately equal thermal expansion properties of the pin elements 42b and the rim base 2.5, tensions in the rim base 2.5 are avoided.

LIST OF REFERENCE NUMBERS

1 Wheel rim 1.1, 1.2, 1.3, 1.4, 1.5
2 Rim base 2.1, 2.2, 2.3, 2.4, 2.5
3 Plate-shaped wheel disc with spoke ring
4 Spoke ring
5 Two-part, ring-shaped connecting element, shell components a, b
6 Radially extending flange ring of shell component a, b
7 Front face of spoke ring
8 Connecting surface of the flange ring pointing in an axial direction
9 Fastening screw
10 Separation layer
11 Star-shaped wheel disc with spoke ends
12 Spokes, spoke end
13 Front face of spoke end
14 Firmly connected, ring-shaped connecting element
15 Star-shaped wheel disc with spoke ends
16 Spokes, spoke end
17 Separation layer
18 Connecting surface pointing inwards in a radial direction
19 Edge of spoke
20 Plate-shaped wheel disc with spoke ring
21 Spoke ring
22 Ring-shaped connecting element
23 Connecting surface pointing inwards in a radial direction
24 Connecting surface pointing in an axial direction
25 Recess of spoke ring
26 Clamping ring
27 Stop face pointing in an opposing axial direction
28 Fastening screw
29 Plate-shaped wheel disc with spoke ring
30 Spoke ring
31 Ring-shaped connecting element
32 Outer shell of the spoke ring
33 Connecting surface pointing inwards in a radial direction
34 Fastening screw
35 Ring segment-shaped connecting element
36 Pin elements
37 Flange bar
38 Connecting surface pointing in an axial direction
39 Fastening screws
40 Plate-shaped wheel disc with spoke ring
41 Spoke ring
42 Eleven-part connecting element, ring component a, pin component b
43 Plate-shaped head
44 Shaft of pin component
45 Opening of ring component
46 Outer shell of spoke ring
47 Connecting surface of ring component pointing inwards in a radial direction
48 Slot
49 Washer
50 Nut

What is claimed is:

1. A wheel, comprising:
    a wheel rim comprising a rim base made of fiber composite material, the rim base comprising a well that includes an inner contour that projects radially inwardly;
    a ring-shaped connecting element connected to the inner contour of the wheel rim, and
    a wheel disc connected to the connecting element, wherein the connecting element is interposed between the wheel rim and wheel disc and spaces apart the rim base from the wheel disc; and
    wherein the wheel disc comprises a plurality of axially extending spokes, each of the spokes including a recess formed on a radially outer side thereof, each recess sized and shaped to receive part of the connecting element so as to prevent axial movement of the wheel disc relative to the wheel rim.

2. The wheel of claim 1 wherein the ring-shaped connecting element is rectangular in cross-section.

3. The wheel of claim 2 wherein the connecting element is formed of glass reinforced plastic (GRP).

4. The wheel of claim 1 wherein the connecting element is a single-piece construction.

5. The wheel of claim 1 further comprising a clamping ring in contact with the connecting element on a side of the connecting element opposite that of the wheel disc, and a plurality of fasteners disposed through the clamping ring, each of the fasteners connecting axially to a respective one of the spokes to connect said spokes to the connecting element.

* * * * *